United States Patent
Wan et al.

(10) Patent No.: US 11,953,697 B1
(45) Date of Patent: Apr. 9, 2024

(54) POSITION TRACKING SENSOR IN A HEAD UP DISPLAY

(71) Applicant: Ford Global Technologies, LLC, Dearborn, MI (US)

(72) Inventors: Jian Wan, Novi, MI (US); Michael Alan Blommer, Ann Arbor, MI (US); Brett Stottlemyer, West Bloomfield, MI (US); Curtis Sai-Hay To, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/312,610

(22) Filed: May 5, 2023

(51) Int. Cl.
G02B 27/01 (2006.01)
B60K 35/00 (2006.01)
(Continued)

(52) U.S. Cl.
CPC .......... *G02B 27/0179* (2013.01); *B60K 35/00* (2013.01); *G02B 27/0103* (2013.01); *G06F 3/012* (2013.01); *G06F 3/013* (2013.01); *G06T 7/50* (2017.01); *G06T 7/70* (2017.01); *G06V 20/59* (2022.01); *G06V 40/172* (2022.01); *G09G 3/001* (2013.01); *B60K 35/23* (2024.01);
(Continued)

(58) Field of Classification Search
CPC ...... B60K 35/00; B60K 35/23; B60K 35/232; B60K 35/233; B60K 35/234; B60K 35/235; B60K 2360/177; B60K 2360/31; G02B 27/01; G02B 2027/0187; G02B 2027/0181; G02B 2027/0185; G02B 27/0093; B60R 2300/205; G06F 3/013; G06F 3/012
See application file for complete search history.

(56) References Cited

U.S. PATENT DOCUMENTS

| 10,996,480 B1 * | 5/2021 | Chang .................... G02B 27/62 |
| 10,996,481 B1 | 5/2021 | Wells et al. |
| 11,222,476 B2 | 1/2022 | Lambert et al. |
| 11,482,141 B1 | 10/2022 | Wells et al. |

(Continued)

FOREIGN PATENT DOCUMENTS

| CN | 108621947 A * | 10/2018 | ............. B60R 1/001 |
| DE | 102017000674 B3 | 5/2018 | |

(Continued)

OTHER PUBLICATIONS

Charissis, V. et al., "Calibration requirements of an automotive HUD interface using a virtual environment: Methodology and implementation," ResearchGate, Jan. 2007, 6 pages.

(Continued)

*Primary Examiner* — Koosha Sharifi-Tafreshi
(74) *Attorney, Agent, or Firm* — Frank Lollo; Bejin Bieneman PLC

(57) ABSTRACT

A computer includes a processor and memory, the memory can store instructions executable by the processor to display a first calibration symbol to appear at a first location of a virtual image plane viewable from a measured location of the eyes or head of an operator and display a second calibration symbol to appear at a second location of the virtual image plane according to an offset distance from the first location. The instructions additionally can additionally be to adjust the offset distance in response to adjusting the second location by receiving input from the operator to align the first calibration symbol with the second calibration symbol.

29 Claims, 8 Drawing Sheets

(51) Int. Cl.
*G06F 3/01* (2006.01)
*G06T 7/50* (2017.01)
*G06T 7/70* (2017.01)
*G06V 20/59* (2022.01)
*G06V 40/16* (2022.01)
*G09G 3/00* (2006.01)
*B60K 35/23* (2024.01)
*B60K 35/28* (2024.01)

(52) U.S. Cl.
CPC ........ *B60K 35/28* (2024.01); *B60K 2360/177* (2024.01); *G02B 2027/0141* (2013.01); *G02B 2027/0187* (2013.01); *G06T 2207/30196* (2013.01); *G06T 2207/30268* (2013.01); *G09G 2320/068* (2013.01); *G09G 2320/0693* (2013.01); *G09G 2320/08* (2013.01); *G09G 2340/0464* (2013.01); *G09G 2354/00* (2013.01); *G09G 2380/10* (2013.01)

(56) References Cited

U.S. PATENT DOCUMENTS

| | | | | |
|---|---|---|---|---|
| 2018/0160087 A1* | 6/2018 | Nill | ............ | B60R 1/00 |
| 2019/0381937 A1* | 12/2019 | Rakshit | ............ | B60K 35/23 |
| 2021/0107357 A1* | 4/2021 | Yu | ............ | G02B 27/0101 |
| 2022/0365357 A1* | 11/2022 | Kuznetsov | ............ | B60K 35/00 |

FOREIGN PATENT DOCUMENTS

| | | | | |
|---|---|---|---|---|
| DE | 112016007208 T5 * | 6/2019 | ............ | B60K 35/00 |
| DE | 102021114028 A1 | 12/2022 | | |
| WO | 2022241638 A1 | 11/2022 | | |

OTHER PUBLICATIONS

Firth, M., "Introduction to automotive augmented reality head-up displays using TI DLP® technology," Texas Instruments, 2019, 10 pages.

* cited by examiner

POSITION TRACKING SENSOR IN A HEAD UP DISPLAY

BACKGROUND

An augmented-reality head up display (AR HUD) for a vehicle can include a projector that projects graphical images for display on a semi-transparent windshield that serves as a combiner or can include an array of holographic optical elements attached to the windshield. Accordingly, the projected graphical images can appear at a virtual image plane that is located in a forward direction with respect to the vehicle. Graphical images appearing in a virtual image plane forward of the vehicle can thus appear to be in a plane that coincides with a real object viewable through the semi-transparent windshield.

DESCRIPTION

Figure 1:
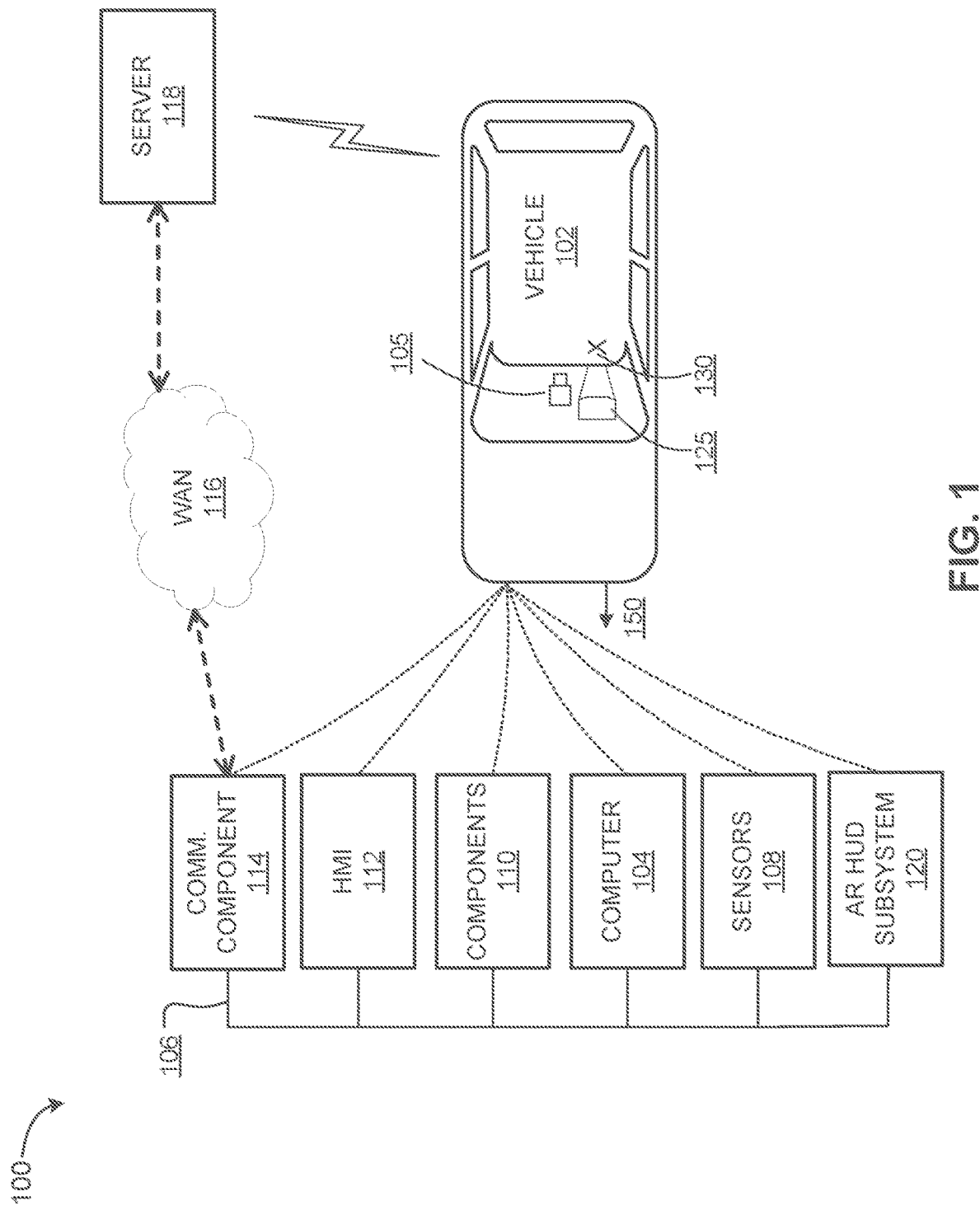
FIG. 1 is a block diagram of an example vehicle.

During operation of a vehicle equipped with an AR HUD subsystem, the subsystem may display graphical images, such as colored markers, icons, indicators, arrows, etc., that can function to cue a vehicle operator toward an area of interest in a driving environment. Such graphical images can assist in maintaining the operator's awareness of changes as such changes come into view of the operator and into the fields-of-view of the vehicle's sensors. For example, when operating a vehicle on a roadway, a vehicle operator may benefit from viewing a graphical image indicating presence of another vehicle, and motion parameters of the vehicle, that has just entered the driving environment. The present disclosure includes techniques to enhance AR HUDs to address situations in which graphical images projected to a virtual image plane can appear to be misaligned with a real (i.e., physical) object viewed through semi-transparent vehicle windshield. In this context, the term "misaligned" means that an object, e.g., a virtual object appearing at a virtual plane, appears to a view to be displaced from an expected location with respect to a different object, e.g., a real object at a real object plane. For example, a graphical symbol, appearing at a virtual plane that is relevant to a real object, at a real object plane, is misaligned with the real object responsive to the graphical symbol appearing to be offset from the real object to which the graphical object refers. Also in this context, the term "aligned" means that an object, e.g., a virtual object appearing at a virtual plane, appears coincident (or at least substantially coincident) with an expected location with respect to a different object, e.g., a real object at a real object plane.

In a vehicle equipped with an AR HUD subsystem, a camera mounted on a dashboard may communicate with a vehicle computer to perform an eye-tracking or head-tracking algorithm based on a two-dimensional scene captured by the dashboard-mounted camera. Such eye-tracking or head-tracking algorithms may utilize features of an operator's head area, e.g., facial and/or nearby features, to estimate a distance between the operator's eyes and the array of holographic optical elements patterned or affixed to the windshield of the vehicle. However, in response to a particular operator's sitting posture, facial features, and other variables, a measured position of the operator's head or eyes may differ from the actual position of the operator's head or eyes. In such instances, when viewing graphical images in a virtual plane, via the array of holographic optical elements of the vehicle windshield, misalignment may occur in which real objects, e.g., other vehicles, positioned in a forward direction of the operator's vehicle, may appear offset from (or misaligned with) real images in the operator's field of view. Such offsets can affect the overall operator experience of piloting a vehicle equipped with an AR HUD subsystem.

Subsystems and/or methods disclosed herein operate to calibrate a position tracking sensor so as to minimize misalignments that result from a difference between a measured position of the operator's head, for example, and the actual position of the operator's head as measured by a camera sensor located at the center portion of the vehicle dashboard. In one example, a vehicle operator may view a first calibration symbol and a second calibration symbol laterally offset from the first calibration symbol in a virtual image plane that is in a forward direction of the vehicle. The vehicle operator can then adjust a control component of a human-machine interface of the vehicle, which operates to merge the first and second calibration symbols until the symbols coincide. The human-machine interface can generate calibration settings that represent the operator's adjustment of the control component, for storage in a memory accessible to a computer of the vehicle. The operator may then utilize the settings when operating the vehicle, thereby viewing graphical images projected by the AR HUD subsystem that align with real objects in the path of the vehicle. At a future time when operating the vehicle, the operator may utilize a facial recognition technique or algorithm to retrieve the operator's personal settings, which may then be utilized by the AR HUD subsystem to apply adjustments to an eye-tracking or head-tracking algorithm. Alternatively, or in addition, the operator's stored calibration settings may be utilized by a projector of the AR HUD subsystem to adjust an angle at which graphical images are projected for display at the virtual image plane.

In an example, a system may include a processor and memory, the memory storing instructions executable by the processor to display a first calibration symbol to appear at a first location of a virtual image plane viewable from a measured location of the eyes or head of an operator and to display a second calibration symbol to appear at a second location of the virtual image plane according to an offset distance from the first location. The instructions may additionally be to adjust the offset distance in response to adjusting the second location by receiving input from the operator to align the first calibration symbol with the second calibration symbol.

The instructions can further include instructions to operate an augmented reality subsystem that displays a graphic symbol according to the adjusted offset distance.

The instructions can further include instructions to transform the input from the operator into an adjustment of the measured location of the eyes or head of the operator.

The instructions can further include instructions to adjust an angle at which a graphic symbol is displayed at a location on the virtual image plane based on the input from the operator scaled by a distance from the measured location of the eyes or head of the operator to a real object.

The instructions can further include instructions to adjust an angle at which the first and second calibration symbols are reflected through a semi-transparent lens of a windshield of a vehicle to the operator's eyes.

The instructions can include instructions to adjust an angle at which the first and second calibration symbols are reflected through an array of holographic optical elements of a windshield of a vehicle from a graphics projector of an augmented reality subsystem to the operator's eyes.

The instructions can further include instructions to adjust a measured distance from a camera capturing a two-dimensional image of the operator via an eye-tracking or head-tracking algorithm.

The instructions can further include instructions to adjust a depth measurement of an area of the measured location of the eyes or head of the operator based on data extracted from an image representing the operator.

The first calibration symbol can be viewable in the virtual image plane located in a direction that is forward of a central portion of a semi-transparent lens of a vehicle.

The system can be a vehicle and the instructions can be further to identify the operator via a facial recognition technique and to display a graphic symbol according to a calibration setting derived from the adjusted offset distance specific to the operator.

The system can be a vehicle and the instructions can further be to identify an operator, seated in a driver's position of the vehicle, based on data extracted from an image representing the operator.

In another example, a method can include displaying a first calibration symbol to appear at a first location of a virtual image plane viewable from a measured location of the eyes or head of an operator. The method can also include displaying a second calibration symbol to appear at a second location of the virtual image plane according to an offset distance from the first location. The method can further include adjusting the offset distance in response to adjusting the second location by receiving an input from the operator to align the first calibration symbol with the second calibration symbol.

The method can additionally include operating an augmented reality subsystem that displays graphical symbols according to the adjusted offset.

The method can additionally include transforming the input from the operator into an adjustment of an area of the measured location of the eyes or head of the operator.

The method can additionally include adjusting an angle at which a graphic symbol is displayed at a location on the virtual image plane based on the input from the operator scaled by a distance from the measured location of the eyes or head of the operator to a real object.

The method can additionally include adjusting an angle at which a graphic symbol is projected to a semi-transparent lens of a windshield of a vehicle.

The method can additionally include adjusting an angle at which a graphic symbol is projected to an array of holographic optical elements of a windshield of a vehicle from a graphics projector of an augmented reality subsystem.

The method can additionally include adjusting a depth measurement of an area of the measured location of the eyes or head of the operator.

The method can additionally include adjusting a depth measurement of an area of the measured location of the eyes or head of the operator based on data extracted from an image representing the operator.

The method can additionally include identifying the operator via a facial recognition technique and displaying a graphic symbol according to the adjusted offset distance specific to the operator.

FIG. 1 is a block diagram of an example vehicle system 100. As seen in FIG. 1, system 100 includes vehicle 102, which includes computer 104 that is communicatively coupled via an internal communications network, such as vehicle network 106, to various elements including sensors 108, a subset of which are one or more cameras 105, subsystems 110, such as steering subsystems, propulsion and braking subsystems, human-machine interface (HMI) 112, and communication subsystems 114. Vehicle computer 104 includes a processor and a memory. A memory of computer 104, such as those described herein, includes one or more forms of computer-readable media, and stores programming instructions executable by vehicle computer 104 for performing various operations, such that the vehicle computer is configured to perform the various operations, including those disclosed herein.

For example, vehicle computer 104 can be a generic computer with a processor and memory as described above and/or may include an electronic control unit (ECU) or a controller for a specific function or set of functions, and/or may include a dedicated electronic circuit including an ASIC (application specific integrated circuit) that is manufactured for a particular operation, e.g., an ASIC for processing data from camera 105 and non-camera sensors 108. In another example, computer 104 of vehicle 102 may include an FPGA (Field-Programmable Gate Array), which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical divisions inside an FPGA may be configured based on VHDL programming, e.g., stored in a memory electrically connected to the FPGA circuit. In some examples, a combination of processor(s), ASIC(s), and/or FPGA circuits may be included in computer 104. Further, computer 104 could include a plurality of computers 104 onboard vehicle 102, e.g., a plurality of ECUs (electronic control units) or the like, operating together to perform operations ascribed herein to vehicle computer 104.

The memory accessible by computer 104 can be of any type, e.g., hard disk drives, solid state drives, servers, or any volatile or non-volatile media. The memory can store the collected data sent from camera 105 and non-camera sensors 108. The memory can be a separate device from computer 104, and computer 104 can retrieve information stored by the memory via a communication network in the vehicle such as vehicle network 106, e.g., over a controller area network (CAN) bus, a local interconnect network (LIN) bus, a wireless network, etc. Alternatively or additionally, the memory can be part of computer 104, e.g., as a memory of computer 104.

Computer 104 can include programming in the form of executable instructions, which operate one or more subsystems 110, such as components of vehicle brakes, propulsion (e.g., one or more of an internal combustion engine, electric motor, hybrid engine, etc.), steering, climate control, interior and/or exterior lights, etc., as well as to determine whether and when computer 104, as opposed to a human operator, is to control such operations. Computer 104 may include or be communicatively coupled to, e.g., via vehicle network 106, such as a communications bus as described further below, more than one processor, e.g., included in subsystems 110 such as non-camera sensors 108, electronic control units (ECUs) or the like included in the vehicle for monitoring and/or controlling various vehicle subsystems, e.g., a powertrain controller, a brake controller, a steering controller, etc.

Computer 104 is generally arranged for communications on vehicle network 106, which can include a communications bus in the vehicle, such as a CAN bus or the like, and/or other wired and/or wireless mechanisms. Vehicle network 106 is a communications bus, which permits messages to be exchanged between various devices, e.g., camera 105, non-camera sensors 108, subsystems 110, computer 104(s), etc., onboard vehicle 102. Computer 104 can be generally programmed to send and/or receive, via vehicle network 106, messages to and/or from other devices in vehicle, e.g., any or all of ECUs, camera 105, non-camera sensors 108, actuators, subsystems 110, communications subsystem 114, human-machine interface (HMI) 112, etc. For example, various subsystems 110 can be controlled by respective ECUs) and/or non-camera sensors 108 may provide data to computer 104 via vehicle network 106.

Sensors 108 may be a device(s) that can obtain one or more measurements of one or more physical phenomena. Some of sensors 108 may detect internal states of the vehicle, for example, wheel speed, wheel orientation, and engine and transmission parameters. Some of sensors 108 may operate to detect the position or orientation of the vehicle utilizing, for example, global positioning system GPS sensors; accelerometers, such as piezo-electric or microelectromechanical systems (MEMS); gyroscopes, such as rate, ring laser, or fiber-optic gyroscopes; inertial measurements units (IMUs); and magnetometers. Some of non-camera sensors 108 may detect the external world, for example, radar sensors, scanning laser range finders, light detection and ranging (LIDAR) devices, and image processing sensors such as optical and/or infrared cameras 105. A LIDAR device operates to detect distances to objects by emitting laser pulses and measuring the time of flight for the pulse to travel to the object and back to the emitter.

Computer 104 may be configured for communicating through a wireless communications interface with a second vehicle, e.g., via a vehicle to vehicle (V2V), a vehicle-to-infrastructure (V-to-I) communication, and/or a vehicle-to-everything (V2X) communication network (i.e., communications that can include V2V and V2I). Some of non-camera sensors 108 are communications devices, for example, vehicle-to-infrastructure V2I or V2V devices, which may operate via a wireless communications network. Communications subsystem 114 may include elements for sending (i.e., transmitting) and receiving radio frequency (RF) communications, e.g., chips, antenna(s), transceiver(s), etc. Communications subsystem 114 represents one or more mechanisms by which computer 104 of vehicle 102 may communicate with other vehicles, and/or elements of a communications infrastructure and may be one or more of wireless communication mechanisms, including any desired combination of wireless and wired communication mechanisms and any desired network topology (or topologies when a plurality of communication mechanisms are utilized). Exemplary V2X communication protocols include cellular, IEEE 802.11, dedicated short-range communications (DSRC), and/or wide area networks (WAN) 116, including the Internet, providing data communication services with server 118. DSRC may have one-way or two-way short-range to medium-range wireless communication channels. A V2X communication network may have multiple channels, each identified by an identifier, e.g., channel number.

Further, in examples in which computer 104 actually comprises a plurality of devices, vehicle network 106 may be utilized to conduct communications between devices represented as computer 104 in this disclosure. For example, vehicle network 106 can include a controller area network (CAN) in which messages are conveyed via a CAN bus, or a local interconnect network (LIN) in which messages are conveyed via a LIN bus. In some implementations, vehicle network 106 can include a network in which messages are conveyed using other wired communication technologies and/or wireless communication technologies, e.g., Ethernet, wireless fidelity (WiFi®), Bluetooth®, Ultra-Wideband, etc. Additional examples of protocols that may be used for communications over vehicle network 106 in some implementations include, without limitation, Media Oriented System Transport (MOST), Time-Triggered Protocol (TTP), and FlexRay. In some implementations, vehicle network 106 can represent a combination of multiple networks, possibly of different types, that support communications among devices in a vehicle.

Computer 104 may additionally include programming to control operations performed by AR HUD subsystem 120. Accordingly, computer 104 may execute programming to perform image recognition of objects external to vehicle 102. Such objects may include static objects, such as road signs, road markings, abutments, overpasses, guardrails, lampposts, buildings, stationary vehicles, natural objects (e.g., rocks, trees, and bodies of water), etc. Objects may include dynamic objects, such as other moving vehicles, motorcycles, pedestrians, etc. In an example, input signals from sensors 108 may be fused by computer 104 so that static or dynamic objects in the environment of vehicle 102 can be detected and classified. In one example, sensors 108 may include a camera and a radar sensor for monitoring objects detected along path 150. Accordingly, output signals from the camera sensor may be fused with output signals from the radar sensor to detect a moving object, i.e., another vehicle and traffic, moving at a particular rate of speed. Responsive to such fusing of data from sensors 108 computer 104 may provide an indication to AR HUD subsystem 120 that a moving vehicle has been detected, at a particular location expressed in a localized coordinate system, moving at a speed estimated by the radar sensor. AR HUD subsystem 120 may then form a graphical image for projection to semi-transparent lens 125 of the windshield of vehicle 102 so as to appear at a virtual image plane. Semi-transparent lens 125 of the windshield of vehicle 102 may include an array of holographic optical elements that permit operator 130 of vehicle 102 (shown at position "X" in FIG. 1) to view the moving vehicle as a real image, along with graphical images descriptive of the detected vehicle's speed. AR HUD subsystem 120 may utilize a suitable eye-tracking or head-tracking algorithm to measure a position of the eyes or the head of operator 130 of vehicle 102. In an example, AR HUD subsystem 120 can utilize facial features of operator 130 in a facial recognition technique of identifying the operator. Facial features of operator 130 can include a distance between the eyes of the operator, a distance between one or more eyes of the operator and the nose of the operator, a distance between the eyes of the operator and the mouth of the operator, and/or any other facial parameters of operator 130. Features nearby to the facial features of operator 130 can include a distance between an ear and the mouth of operator 130, the hairline of operator 130, or any other features of operator 130 visible to camera 105. In some instances, prior to obtaining facial-recognition-based access to the vehicle, an operator may participate in an enrollment process. In an enrollment process, camera 105 may capture images of the operator's facial and other features from various angles, which allows computer 104 to recognize the enrolled operator's facial and/or other features at various orientations of the operator's facial features with respect to the camera.

Programming of computer 104 can utilize define a coordinate system, e.g., a three-dimensional (3D) Cartesian coordinate system with a specified origin and orthogonal X, Y, and Z axes, for the interior of vehicle 102. In an example, camera 105 can capture a two-dimensional image of the facial features of operator 130 within vehicle 102. Signals representing the two-dimensional image may be utilized by image processing programming of computer 104 to measure or estimate a distance (e.g., a depth) between the operator's eyes or head and camera 105. Camera 105 may be mounted at a center portion of a dashboard of vehicle 102 at a lateral distance ($X_c$) from the centerline of the driver's seat of vehicle 102. Based on the measured distance between camera 105 and the operator's head or eyes, programming of computer 104 can adjust the angle at which a projector of AR HUD subsystem 120 projects images to semi-transparent lens 125 of the windshield of vehicle 102 so as to appear at a virtual image plane. In an example, projector of AR HUD subsystem 120 projects graphical images that appear to be at certain locations on a virtual image plane located in a forward direction relative to vehicle 102. The graphical images can be relevant to real objects viewable by the operator through semi-transparent lens 125. In an example, image processing programming of computer 104 utilizes parameters of the face and/or head of operator 130 to track movement of the operator's face and/or head so as to generate and project the graphical images for display at specified locations on the virtual image plane.

However, in some instances, use of facial features of certain operators of vehicle 102 may result in graphical images projected by AR HUD subsystem 120 appearing at locations that are misaligned or offset from a corresponding real image viewed through semi-transparent lens 125. In an example, responsive to operator 130 having larger than average sized facial features, the operator may appear to be positioned closer to camera 105 than an operator having average facial features. In another example, responsive to operator 130 having smaller than average facial features the operator may appear to be positioned at a greater distance from camera 105 than an operator having average sized facial features. Under such conditions, a discrepancy may exist between the measured position of the eyes and/or head of operator 130 and the actual position of the operator's eyes and/or head position. Such a discrepancy may give rise to a misalignment between a real image and a graphical image, which may include information relevant to the real image, appear to be offset from each other when viewed through semi-transparent lens 125 of the windshield of vehicle 102.

Exemplary System Operations

Figure 2A:
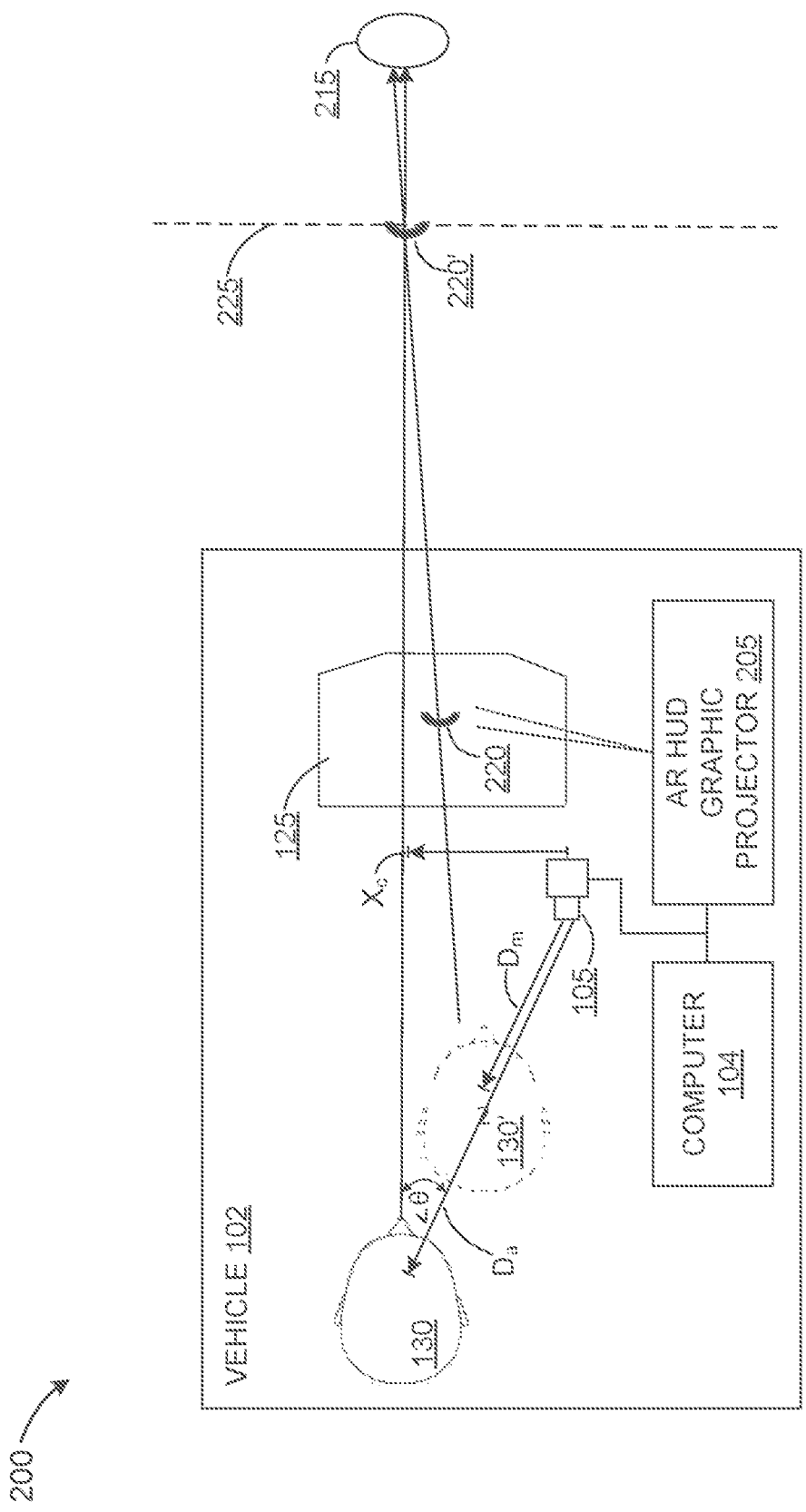
FIG. 2A is a diagram showing an offset between a real object and a graphical image in an AR HUD subsystem.

FIG. 2A is a diagram 200 showing a misalignment between a real object and a graphical image in an AR HUD subsystem. As illustrated in FIG. 2A, camera 105 can capture an image of operator 130 positioned in a driver's position of vehicle 102. However, operator 130 may have facial features, for example, which are larger than average, such as a larger than average spacing between the eyes of the operator, a larger than average distance between the eyes and the nose of the operator, and/or a larger than average distance between the eyes and the mouth of the operator. Operator 130 can thus appear to be positioned at the location of operator 130' at a distance $D_m$, and at an off-axis angle $\Theta$ with respect to operator 130. Responsive to execution of image processing programming by computer 104 for an operator positioned at the location of operator 130', AR HUD graphics projector 205 may project graphical image 220 appropriate for viewing by an operator positioned at the location of operator 130'. In response to AR HUD graphics projector 205 generating and projecting a graphical image for display at a virtual image plane, the semi-transparent lens may render graphical image 220 to appear as graphical image 220' at virtual image plane 225, located in a forward direction relative to vehicle 102. Accordingly, if an operator at the location of operator 130' were to view graphical image 220', the operator would view an image corresponding to real object 215 at a location aligned with graphical image 220'.

However, operator 130, positioned at an actual distance D a from camera 105, may view real object 215 through semi-transparent lens 125 as appearing offset (i.e., to the left) of the real image. Hence, graphical image 220, rendered at virtual image plane 225, would not coincide with real object 215. In an example, responsive to graphical image 220 including a descriptor that provides information regarding a static object in the driving environment of vehicle 102, the descriptor may appear offset from the static object, thus detracting from the overall driving experience of vehicle 102.

Figure 2B:
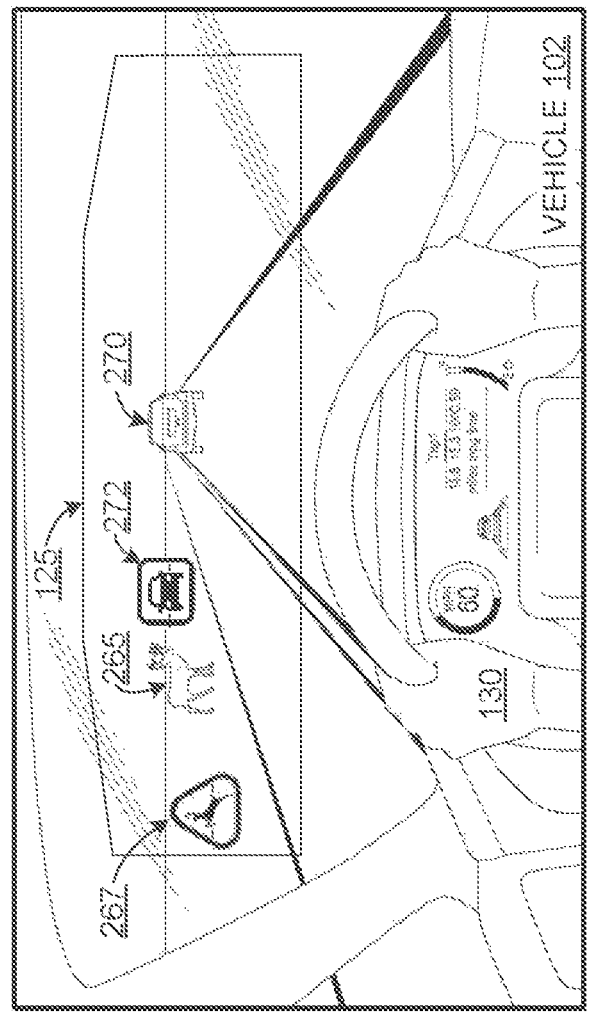
FIG. 2B is a diagram showing an offset between real objects and graphical images as viewed by an operator of a vehicle.

FIG. 2B is a diagram 250 showing an offset between real objects and graphical images as viewed by an operator of vehicle 102. As seen in FIG. 2B, operator 130, having both hands on the steering wheel of vehicle 102, can view deer 265 and vehicle 270 through semi-transparent lens 125. Deer 265 and vehicle 270 correspond to real objects viewable in a direction forward of vehicle 102. FIG. 2A also shows graphical image 267, i.e., a deer icon, and graphical image 272, i.e., a vehicle icon, which are projected to semi-transparent lens 125 and viewable at virtual image plane 225 of FIG. 2A. As described in reference to FIG. 2A, responsive to AR HUD graphics projector 205 projecting graphical images based on a measured location of the operator, e.g., corresponding to operator 130' of FIG. 2A, (in contrast with the actual position of operator 130) graphical image 272 appears misaligned with deer 265. Accordingly, graphical image 272 may appear closer to deer 265 than to vehicle 270. In addition, graphical image 267 may be misaligned with deer 265 at a location that is offset from deer 265.

Thus, operator 130 may engage in a process to adjust for a misalignment introduced by an eye-tracking or head-tracking sensor of AR HUD subsystem 120. In an example, operator 130 may be positioned in a driver's position of vehicle 102 so as to permit actuation of a component of an HMI 112. In such a process, described in greater detail herein, a first calibration symbol may be projected so as to appear at virtual image plane 225 responsive to camera 105 and image processing programming of computer 104 measuring the position of the eyes and/or head of operator 130. A second calibration symbol may be viewable by operator 130 positioned at the operator's actual location. Operator 130 may then actuate the component of HMI 112 until the first and second calibration symbols align with each other. Operator 130 may then select to store the results of the calibration process for subsequent use when operating vehicle 102. Thus, in an example, responsive to operator 130 being again positioned in the driver's position of vehicle 102, camera 105 may capture an image of operator 130 for processing by facial image, e.g., facial recognition, processing programming of computer 104. Computer 104 can then apply calibration parameters either to an eye-tracking or head-tracking algorithm utilized by AR HUD subsystem 120 or to AR HUD graphics projector 205. In either instance, graphical images (e.g., graphical image 220) appearing at virtual image plane 225 can be aligned with respect to real objects viewable by the operator through semi-transparent lens 125.

Figure 3:
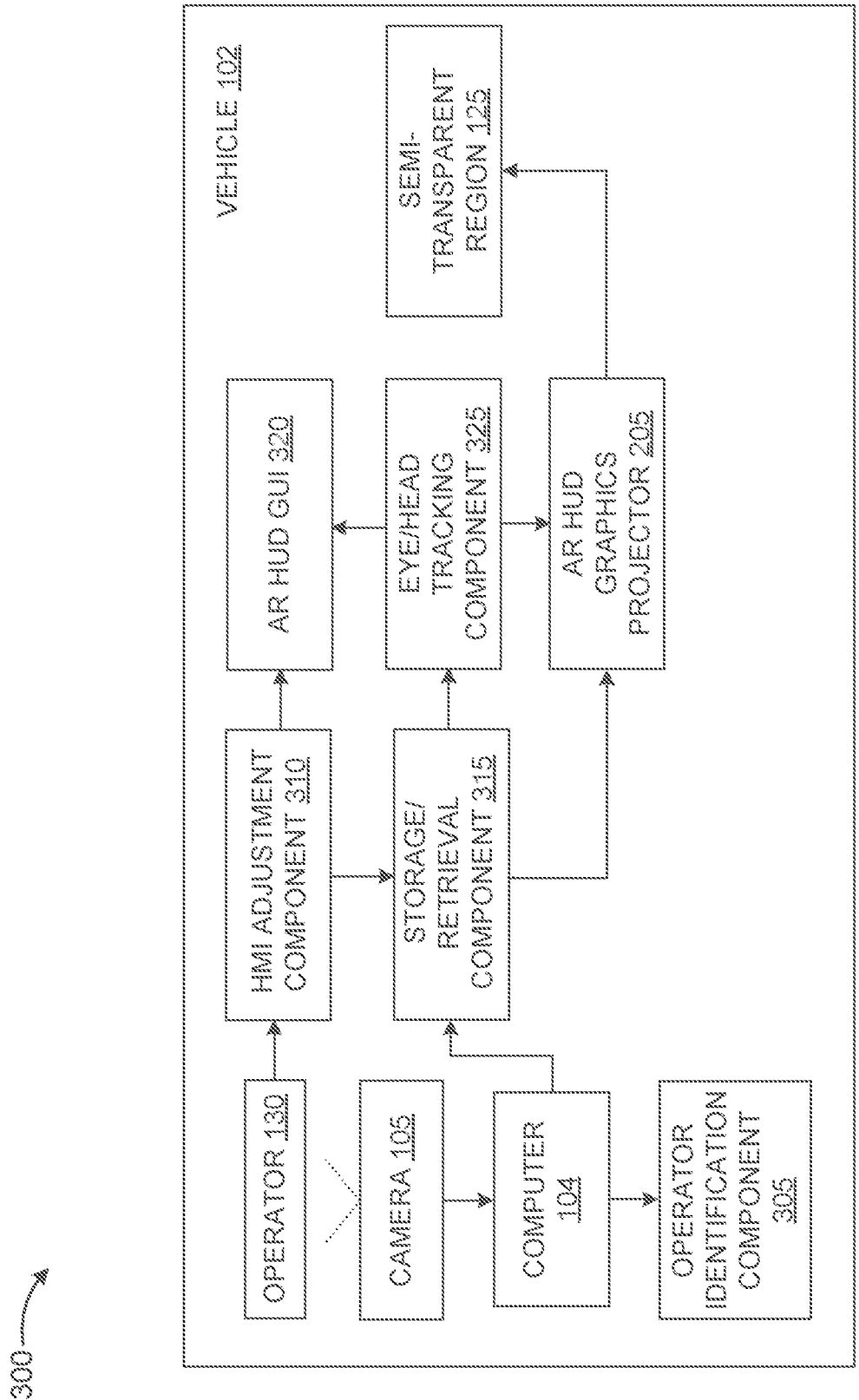
FIG. 3 is a block diagram showing components utilized to calibrate an eye-tracking or a head-tracking sensor of an AR HUD subsystem.

FIG. 3 is a block diagram 300 showing components utilized to calibrate an eye-tracking or a head-tracking sensor of AR HUD subsystem 120. In FIG. 3, operator 130, seated in the driver's position of vehicle 102, is shown as being within the field-of-view of camera 105. Operator 130 can thus interact with adjustment component 310 of an HMI of vehicle 102. In an example, programming of AR graphical user interface 320 directs AR HUD graphics projector 205 to project first and second calibration symbols to appear at virtual image plane 225. A first calibration symbol may be a symbol viewable from the perspective of the actual positions of the eyes or head of operator 130. A second calibration symbol may be a symbol positioned according to a measured position of the eyes or head of operator 130, as determined by camera 105 interacting with programming of computer 104 of vehicle 102. In the example of FIG. 3, operator 130 may manually actuate HMI adjustment component 310 until second calibration symbol is brought into alignment or coincidence with the first calibration symbol. Operator 130 may then direct storage/retrieval component 315 to store the results of the calibration process, e.g., calibration settings, from HMI adjustment component 310.

Calibration settings from storage/retrieval component 315 may be conveyed to eye/head tracking component 325 to compensate for differences between the measured position of the eyes or head of operator 130 while the operator is viewing graphical images, e.g., graphical image 220, appearing at virtual image plane 225. Thus, for example, referring to FIG. 2A, a calibration setting can be in the form of an adjustment to a depth measurement ($D_m$), e.g., representing a measured distance from camera 105 to the eyes/head of operator 130, based on the actual depth of operator 130 ($D_a$), e.g., representing an actual distance from camera 105 to the eyes/head of operator 130. Adjustment of a lateral offset, which may be utilized by eye/head tracking component 325, may be expressed via expression (1) below:

$$\text{Lateral Offset} = X_c - D_m * \text{Sin}(\Theta) * C \quad (1)$$

wherein expression (1) operates to transform calibration settings from HMI adjustment component 310 into an adjustment in the position of the head or eyes of operator 130, e.g., using a suitable system that tracks an occupant's eyes or gaze and/or movements and positions of an occupant's head. $X_c$ represents the lateral distance from the center of an occupant's e.g., an operator's seat, of vehicle 102 (as shown in FIG. 2A) and wherein $\Theta$ (of FIG. 2A) represents the off-axis angle $\Theta$ of the position of operator 130' with respect to camera 105 in a coordinate system internal to vehicle 102. The parameter "C," which may assume values of between, for example, 0 and 1, represents the value of the adjustment entered by operator 130 interacting with HMI adjustment component 310.

In another example, calibration settings from storage/retrieval component 315 are conveyed to AR HUD graphics projector 205, which may operate to project graphical image 220 to locations on a virtual image plane for viewing by operator 130. Accordingly, graphical images projected by AR HUD graphics projector 205 can appear locations on a virtual image plane that align with real objects viewable by operator 130 through semi-transparent lens 125.

In the example of FIG. 3, computer 104 may store calibration settings of operator 130 for future use along with calibration settings specific to other enrolled operators of vehicle 102. In an example, in response to vehicle 102 being occasionally operated by individuals of the same household, calibration settings may be stored for each individual of the household that may operate vehicle 102. In an example, computer 104 of vehicle 102 may capture an image of an operator via camera 105. Image processing programming of computer 104 may extract features of captured images from camera 105 and utilize a facial recognition technique or algorithm to retrieve the stored calibration settings of the particular operator. The calibration settings may be utilized by operator identification component 305 to apply adjustments to an eye-tracking or head-tracking algorithm for the particular identified operator. Alternatively, or in addition, the stored calibration settings may be utilized by AR HUD graphics projector 205 to adjust an angle at which graphical images are projected to semi-transparent lens 125 of the vehicle's windshield.

Figure 4A:
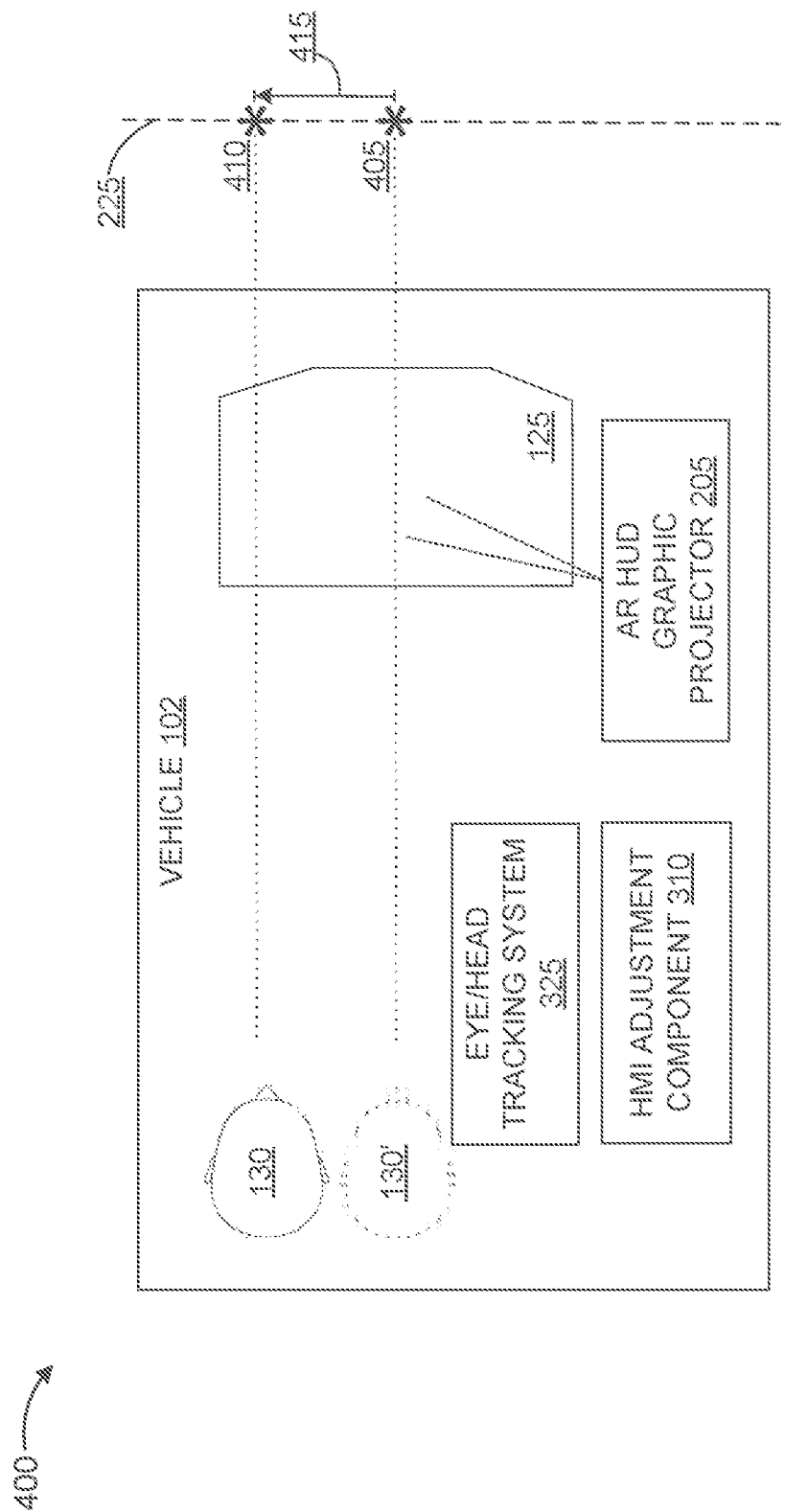
FIG. 4A is a diagram of an operator interacting with example adjustment components to calibrate a position tracking sensor.

FIG. 4A is a diagram 400 of an operator interacting with example adjustment components to calibrate a position tracking sensor. In FIG. 4, AR HUD graphics projector 205 may generate and project first calibration symbol 405 to semi-transparent lens 125 so as to cause the symbol 405 to appear at virtual image plane 225. For example, first calibration symbol 405 may be projected to a location of semi-transparent lens 125 viewable by operator 130', positioned at a measured distance from camera 105. In an example, first calibration symbol 405 can be projected to a center portion of semi-transparent lens 125 for display at virtual image plane 225. While AR HUD graphics projector 205 projects first calibration symbol 405, graphics projector 205 may project second calibration symbol 410 to a location of the lens 125 that is offset by an amount computed via expression (1) described in relation to FIG. 3. Operator 130 may then interact with HMI adjustment component 310 to adjust the location of first calibration symbol 405 until the calibration symbol appears to the operator to coincide with second calibration symbol 410, as given by arrow 415 (e.g., by providing input via a knob, slider on a touchscreen etc.). Operator 130 may then provide input to storage/retrieval component 315 to store a calibration setting specific to operator 130. Calibration settings may be utilized by eye/head tracking component 325 to compensate for differences between the measured position of operator 130 and the actual position of operator 130. Alternatively, calibration settings may be utilized by AR HUD graphics projector 205 to adjust the angle at which graphical images are projected to semi-transparent lens 125.

Figure 4B:
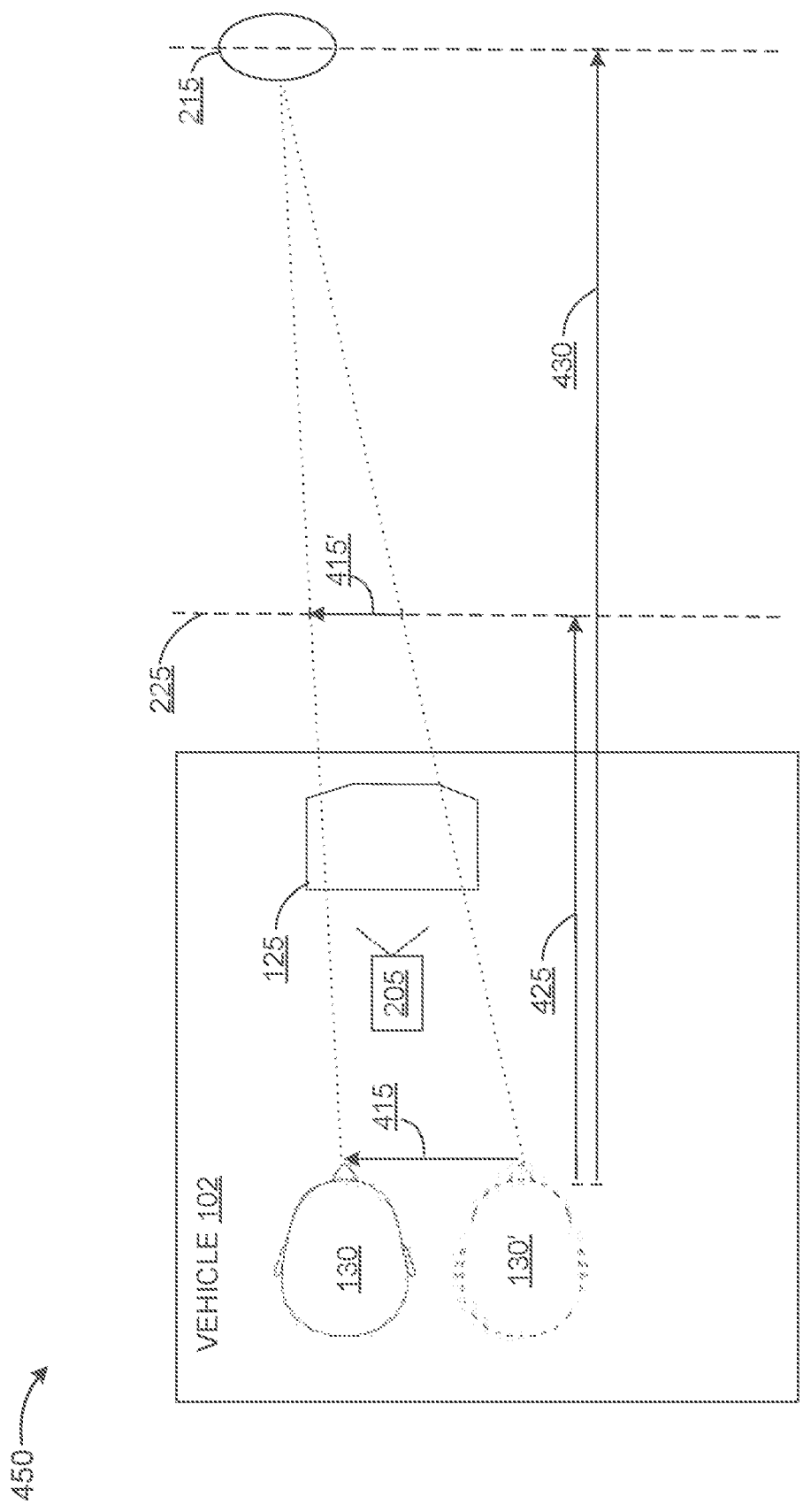
FIG. 4B is a diagram of an operator viewing a real object.

FIG. 4B is a diagram 450 of operator 130 viewing a real object 215. As seen in FIG. 4B, real object 215, which may be a static (non-moving) or dynamic (moving) physical object, is located behind virtual image plane 225. Virtual image plane 225 is located in a forward direction of vehicle 102, thereby allowing operator 130 to view images that appear to be in a forward direction of vehicle 102. FIG. 4B thus illustrates operation of the AR HUD that may utilize calibration settings determined as described in reference to FIG. 4A.

In FIG. 4B, arrow 415 represents a calibration setting obtained via input by operator 130 via HMI adjustment component 310. In an example, the length of arrow 415, which represents an offset adjustment, may be scaled utilizing a proportionality factor that relates the difference between the distance from vehicle 102 to real object 215 and the distance to virtual image plane 225. Such a proportional relationship is given in expression (2) below:

$$\text{Offset Adjustment} = \text{Calibration Setting} * (OD - VID) \quad (2)$$

wherein the calibration setting of expression (2) represents parameter "C" described in reference to FIG. 4A. The parameter VID represents distance 425, which is the distance from operator 130 to virtual image plane 225. The parameter OD represents distance 430, which is the distance from operator 130 to real object 215. Distance 430 may be determined via sensors 108, such as through the use of a radar or LIDAR sensor. Scaling of the offset adjustment of expression (2) may be performed by AR HUD graphics projector 205.

Figure 5:
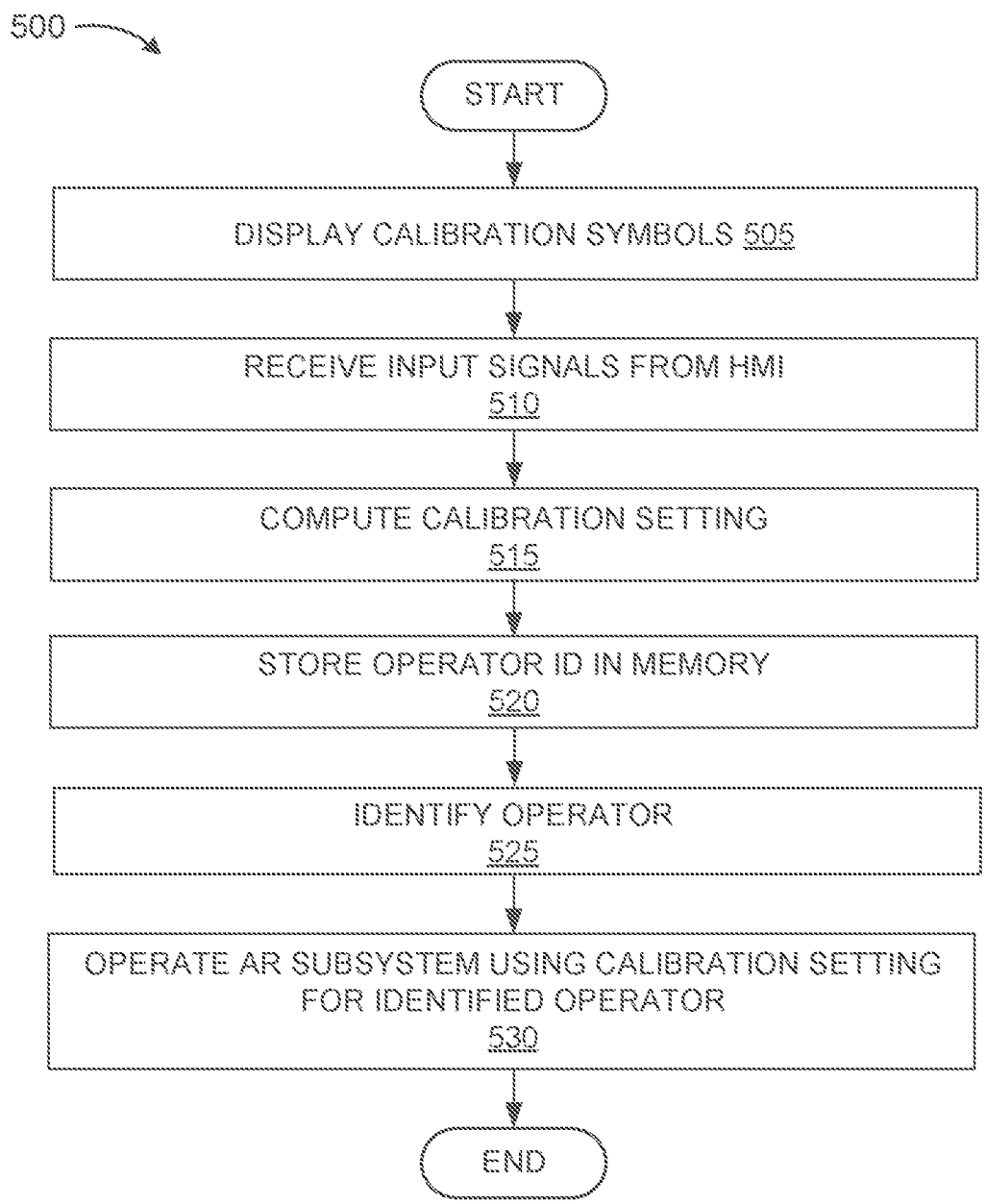
FIG. 5 is a flowchart of an example process for calibrating a position tracking sensor.

FIG. 5 is a flowchart of an example process 500 for calibrating a position tracking sensor. As a general overview, process 500 can include operator 130 of vehicle 102 viewing a first calibration symbol 405 and a second calibration symbol 410 offset from the first calibration symbol in virtual image plane 225. The first calibration symbol 405 can be projected to a central portion of semi-transparent lens 125, which may include an array of holographic optical elements of the vehicle's windshield, so as to appear at virtual image plane 225. The second calibration 410 symbol can be displayed at a location of virtual image plane 225 determined by geometrical factors in accordance with expression (1) described herein. Expression (1) can be computed utilizing a lateral distance corresponding to $X_c$ from a center of the driver's seat of vehicle 102, product of the sine of the angle Θ (of FIG. 2A), which represents the off-axis angle Θ of the position of operator 130' with respect to camera 105 in a coordinate system internal to vehicle 102. Expression (1) additionally utilizes the measured distance (D m) from camera 105 to the measured position of an operator (130') based on facial features of operator 130'. Calibration settings may be utilized by eye/head tracking component 325 or by AR HUD graphics projector 205, both of which operate to project graphical image 220 to appear at virtual image plane 225. Graphical image 220 can include a descriptor to provide information with respect to a static or dynamic object in the driving environment of vehicle 102.

Process 500 begins at block 505, which includes AR HUD graphics projector 205 displaying calibration symbols 405, 410 at semi-transparent lens 125 of the windshield of vehicle 102 to appear at virtual image plane 225. A first calibration symbol 405 can be displayed at a center portion viewable by operator 130' based on a measured distance from camera 105 mounted at a central portion of the dashboard of vehicle 102. A second calibration symbol 410 can be displayed at a location computed in accordance with expression (1) utilizing the lateral distance ($X_c$) from camera 105 to the center of the driver's seat of vehicle 102.

Process 500 continues at block 510, which includes receiving input from operator 130 in a process of aligning the second calibration symbol to coincide with the first calibration symbol. Block 510 may be performed utilizing HMI adjustment component 310. In an example, operator 130 may rotate or actuate a control knob, depress a control switch, move a slider control on a touchscreen, and/or perform any other manipulation of HMI adjustment component 310 to provide input for aligning the first and second calibration symbols 405, 410 displayed via AR HUD graphics projector 205.

Process 500 continues at block 515, which includes computer 104 of vehicle 102 computing calibration settings responsive to receiving signals from HMI adjustment component 310. Programming of computer 104 may adjust output signals of eye/head tracking component 325 so as to provide output signals representing the actual position of the eyes or head of operator 130. Alternatively, or in addition, computer 104 may adjust input signals to AR HUD graphics projector 205, so that graphical image 220 is displayed at virtual image plane 225 at a location that coincides with real object 215 viewable through semi-transparent lens 125.

Process 500 continues at block 520, which includes storing calibration settings for operator 130 into storage/retrieval component 315. Calibration parameters for other operators of vehicle 102 can also be stored via storage/retrieval component 315. Upon retrieval from component 315, calibration settings can be applied to eye/head tracking component 325 and/or to AR HUD graphics projector 205, e.g., as described above. Calibration settings can be utilized by tracking component 325 and/or graphics projector 205 so that graphical images can be rendered at virtual image plane 225 at locations that align with real object 215 when viewed by operator 130 through semi-transparent lens 125. In an example, calibration settings are specific to each operator of vehicle 102 based on the operator's size, facial features, sitting posture, hairline, or other parameters of the operator.

Process 500 continues at block 525, which includes identification of an operator, who may have exited and subsequently reentered the vehicle, or may include identification of any other operator that has previously performed a calibration process such as that described herein. Block 525 can include camera 105 transmitting a digitized image of an operator, e.g., operator 130, or any other operator, so that image processing programming of computer 104 can extract images of the facial features of the operator, for example, and compare the extracted facial features with enrolled operators of vehicle 102 so that calibration settings can be applied to eye/head tracking component 325 and/or to AR HUD graphics projector 205.

Process 500 continues at block 530, in which AR HUD subsystem 120 is operated utilizing calibration settings for an identified operator. Block 530 may include computer 104 scaling an offset adjustment utilizing a proportionality factor that relates the difference between the distance from vehicle 102 to real object 215 and the distance to virtual image plane 225. In one example, scaling is performed in accordance with expression (2) described herein. Operation of AR HUD subsystem 120 after applying calibration settings is further described in reference to FIG. 6 herein.

After completing block 530, process 500 ends.

Figure 6:
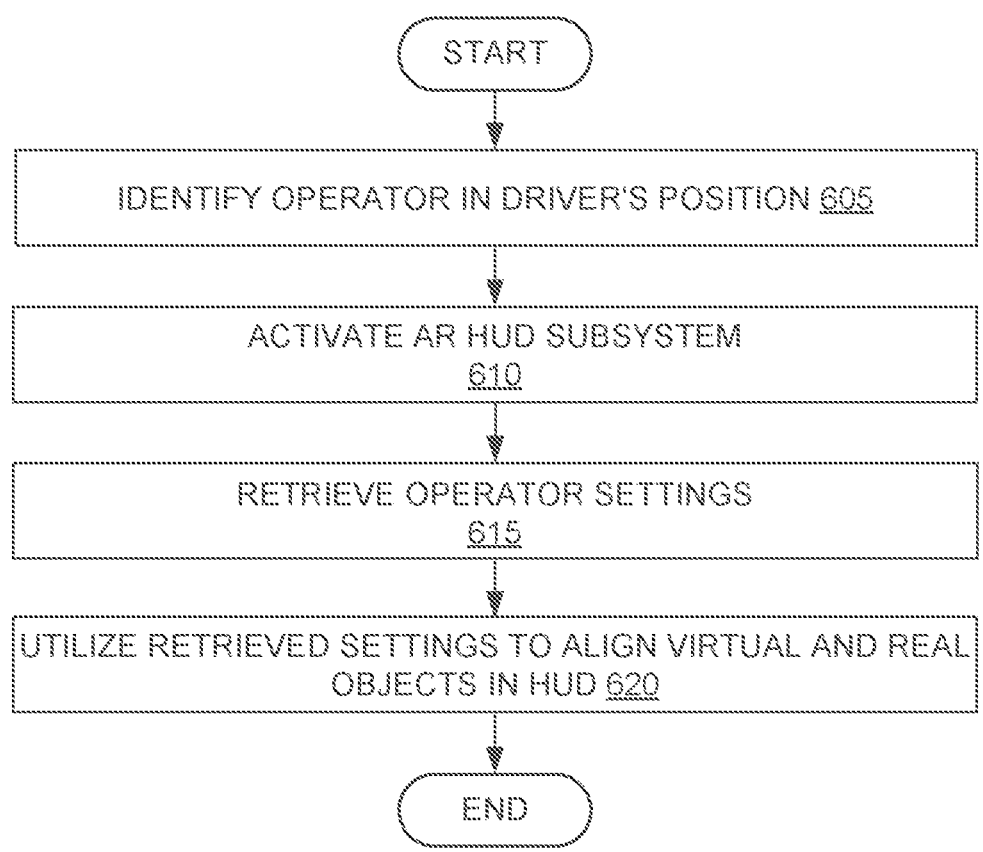
FIG. 6 is a flowchart of an example method for operating a HUD.

FIG. 6 is a flowchart of an example process 600 for operating AR HUD subsystem 120. Process 600 may be completed after executing process 500 for calibrating a position tracking sensor. As a general overview of process 600, an AR HUD subsystem that has been adjusted to compensate for misalignments resulting from eye/head tracking component 325 utilizing a measured location of the eyes/head of operator 130 rather than the actual location of the eyes/head of operator 130. Process 600 may be performed for additional operators who may occasionally utilize vehicle 102.

Process 600 begins at block 605, which includes identifying an operator at the driver's position of vehicle 102. As described in reference to FIG. 3, image processing programming of computer 104 may extract features of captured images from camera 105 and utilize a facial recognition technique or algorithm to identify the operator seated in the driver's position of vehicle 102.

Process 600 continues at block 610, which includes programming of computer 104 activating AR HUD subsystem 120, such as described herein. AR HUD subsystem 120 operates to display graphical images to semi-transparent lens 125, which may appear at virtual image plane 225.

Process 600 continues at block 615, which includes AR HUD subsystem 120 retrieving calibration settings for the operator identified at block 605. In an example, responsive to image processing programming of computer 104 identifying operator 130 as being authorized to utilize vehicle 102, AR HUD subsystem 120 retrieves calibration settings specific to the identified operator.

Process 600 continues at block 620, which includes applying calibration settings to compensate for differences between the measured position of the eyes or head of operator 130 utilizing eye-head tracking component 325. Alternatively, or in addition, the operator's stored calibration settings may be utilized by AR HUD graphics projector 205 to adjust an angle at which graphical images are projected to semi-transparent lens 125 for viewing at virtual image plane 225. In response to sensors 108 of vehicle 102 detecting real objects within the sensors' field-of-view, graphical images, e.g., 267, 272, may be generated and projected to align with corresponding real objects at the plane of the real objects. Thus, in an example, graphical image 267 may appear at virtual image plane 225 and in alignment with deer 265. In addition, graphical image 272 may appear at virtual image plane 225 and in alignment with vehicle 270.

Operations, systems, and methods described herein should always be implemented and/or performed in accordance with an applicable owner's/user's manual and/or safety guidelines.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an onboard vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It should further be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising a computer including a processor and memory, the memory storing instructions executable by the processor to:
    display a first calibration symbol to appear at a first location of a virtual image plane viewable from a measured location of the eyes or head of an operator;
    display a second calibration symbol to appear at a second location of the virtual image plane according to an offset distance from the first location;
    adjust the offset distance in response to adjusting the second location by receiving input from the operator to align the first calibration symbol with the second calibration symbol; and
    adjust an angle at which a graphic symbol is displayed at a location on the virtual image plane based on the input from the operator scaled by a distance from the measured location of the eyes or head of the operator to a real object.

2. The system of claim 1, wherein the instructions further include instructions to:
    operate an augmented reality subsystem that displays the graphic symbol according to the adjusted offset distance.

3. The system of claim 1, wherein the instructions further include instructions to:
    transform the input from the operator into an adjustment of the measured location of the eyes or head of the operator.

4. The system of claim 1, wherein the instructions further include instructions to:
    adjust an angle at which the first and second calibration symbols are reflected through a semi-transparent lens of a windshield of a vehicle to the operator's eyes.

5. The system of claim 1, wherein the instructions include further instructions to:
    adjust an angle at which the first and second calibration symbols are reflected through an array of holographic optical elements of a windshield of a vehicle from a graphics projector of an augmented reality subsystem to the operator's eyes.

6. The system of claim 1, wherein the instructions further include instructions to adjust a measured distance from a camera capturing a two-dimensional image of the operator via an eye-tracking or head-tracking algorithm.

7. The system of claim 1, wherein the instructions further include instructions to adjust a depth measurement of an area of the measured location of the eyes or head of the operator, based on data extracted from an image representing the operator.

8. The system of claim 1, wherein the first calibration symbol is viewable in the virtual image plane located in a direction that is forward of a central portion of a semi-transparent lens of a vehicle.

9. The system of claim 1, wherein the system is a vehicle, and wherein the instructions are further to:
    identify the operator via a facial recognition technique; and
    display the graphic symbol according to a calibration setting derived from the adjusted offset distance specific to the operator.

10. The system of claim 1, wherein the system is a vehicle, and wherein the instructions are further to:
    identify the operator seated in a driver's position of the vehicle based on data extracted from an image representing the operator.

11. A method, comprising:
    displaying a first calibration symbol to appear at a first location of a virtual image plane viewable from a measured location of the eyes or head of an operator;
    displaying a second calibration symbol to appear at a second location of the virtual image plane according to an offset distance from the first location;
    adjusting the offset distance in response to adjusting the second location by receiving an input from the operator to align the first calibration symbol with the second calibration symbol; and
    adjusting an angle at which a graphic symbol is displayed at a location on the virtual image plane based on the input from the operator scaled by a distance from the measured location of the eyes or head of the operator to a real object.

12. The method of claim 11, further comprising:
    operating an augmented reality subsystem that displays graphical symbols according to the adjusted offset.

13. The method of claim 11, further comprising:
    transforming the input from the operator into an adjustment of an area of the measured location of the eyes or head of the operator.

14. The method of claim 11, further comprising:
    adjusting an angle at which the graphic symbol is projected to a semi-transparent lens of a windshield of a vehicle.

15. The method of claim 11, further comprising:
    adjusting an angle at which the graphic symbol is projected to an array of holographic optical elements of a windshield of a vehicle from a graphics projector of an augmented reality subsystem.

16. The method of claim 11, further comprising:
    adjusting a depth measurement of an area of the measured location of the eyes or head of the operator.

17. The method of claim 11, further comprising:
    adjusting a depth measurement of an area of the measured location of the eyes or head of the operator based on data extracted from an image representing the operator.

18. The method of claim 11, further comprising:
    identifying the operator via a facial recognition technique; and
    displaying the graphic symbol according to the adjusted offset distance specific to the operator.

19. A system, comprising a computer including a processor and memory, the memory storing instructions executable by the processor to:
    display a first calibration symbol to appear at a first location of a virtual image plane viewable from a measured location of the eyes or head of an operator;

display a second calibration symbol to appear at a second location of the virtual image plane according to an offset distance from the first location;

adjust the offset distance in response to adjusting the second location by receiving input from the operator to align the first calibration symbol with the second calibration symbol; and adjust an angle at which the first and second calibration symbols are reflected through a semi-transparent lens of a windshield of a vehicle to the operator's eyes.

20. The system of claim 19, wherein the instructions further include instructions to:

operate an augmented reality subsystem that displays a graphic symbol according to the adjusted offset distance.

21. The system of claim 19, wherein the instructions further include instructions to:

transform the input from the operator into an adjustment of the measured location of the eyes or head of the operator.

22. The system of claim 19, wherein the semi-transparent lens of the windshield includes an array of holographic optical elements.

23. The system of claim 19, wherein the instructions further include instructions to adjust a measured distance from a camera capturing a two-dimensional image of the operator via an eye-tracking or head-tracking algorithm.

24. The system of claim 19, wherein the instructions further include instructions to adjust a depth measurement of an area of the measured location of the eyes or head of the operator, based on data extracted from an image representing the operator.

25. The system of claim 19, wherein the first calibration symbol is viewable in the virtual image plane located in a direction that is forward of a central portion of the semi-transparent lens of the vehicle.

26. The system of claim 19, wherein the instructions are further to:

identify the operator via a facial recognition technique; and display a graphic symbol according to a calibration setting derived from the adjusted offset distance specific to the operator.

27. A method, comprising:

displaying a first calibration symbol to appear at a first location of a virtual image plane viewable from a measured location of the eyes or head of an operator;

displaying a second calibration symbol to appear at a second location of the virtual image plane according to an offset distance from the first location;

adjusting the offset distance in response to adjusting the second location by receiving an input from the operator to align the first calibration symbol with the second calibration symbol; and adjusting an angle at which a graphic symbol is projected to a semi-transparent lens of a windshield of a vehicle.

28. The method of claim 27, further comprising:

operating an augmented reality subsystem that displays graphical symbols according to the adjusted offset.

29. The method of claim 27, wherein the semi-transparent lens of the windshield includes an array of holographic optical elements.

\* \* \* \* \*